United States Patent
Baguley

(10) Patent No.: US 11,178,854 B2
(45) Date of Patent: Nov. 23, 2021

(54) VERTICAL EGG WASHER AND DRYER SUCH AS INTEGRATED INTO AN EGG PROCESSING LINE

(71) Applicant: Moba Group B.V., Barneveld (NL)

(72) Inventor: Robert Grant Baguley, Lock Haven, PA (US)

(73) Assignee: Moba Group B.V., Barneveld (NL)

( * ) Notice: Subject to any disclaimer, the term of this patent is extended or adjusted under 35 U.S.C. 154(b) by 315 days.

(21) Appl. No.: 16/389,021

(22) Filed: Apr. 19, 2019

(65) Prior Publication Data

US 2020/0221671 A1 Jul. 16, 2020

Related U.S. Application Data

(60) Provisional application No. 62/790,638, filed on Jan. 10, 2019.

(51) Int. Cl.
*A01K 43/00* (2006.01)
*B65G 17/00* (2006.01)
(Continued)

(52) U.S. Cl.
CPC .......... *A01K 43/005* (2013.01); *B65G 17/002* (2013.01); *B65G 17/40* (2013.01);
(Continued)

(58) Field of Classification Search
CPC .... A01K 43/005; B65G 17/002; B65G 17/40; B65G 45/22; B65G 2207/14; B65G 2201/0208
(Continued)

(56) References Cited

U.S. PATENT DOCUMENTS 2,714,257 A 8/1955 Reading
3,049,135 A * 8/1962 Kuhl .................. A01K 43/005
134/72
(Continued)

FOREIGN PATENT DOCUMENTS

EP 368414 A1 5/1990
WO 2012044156 A1 4/2012

OTHER PUBLICATIONS

Big Dutchman Egg Collections Systems brochure, www.bigdutchman.de; 8 pages; Jun. 14, 2015.
(Continued)

*Primary Examiner* — James R Bidwell
(74) *Attorney, Agent, or Firm* — Dinsmore & Shohl LLP

(57) ABSTRACT

A vertical washer or dryer, such as integrated into an egg handling operation. The vertical washer or dryer includes a vertically extending body supporting a carousel conveyor adapted to support pluralities of eggs during transport in successive ascending and descending fashion within the body between an inlet location and an outlet location of the body. A first egg conveyor communicates the eggs with the inlet location of the carousel conveyor, a second egg conveyor communicating the eggs with the outlet location. A least one of a plurality of egg washer spray bars or, in the separate variant, a plurality of egg dryer air knives, are integrated into the body in communication with the carousel conveyor for washing/drying the eggs while supported upon the carousel conveyor.

25 Claims, 13 Drawing Sheets

(51) Int. Cl.
  *B65G 17/40* (2006.01)
  *B65G 45/22* (2006.01)
(52) U.S. Cl.
  CPC ...... *B65G 45/22* (2013.01); *B65G 2201/0208* (2013.01); *B65G 2207/14* (2013.01)
(58) Field of Classification Search
  USPC ........................................................ 198/495
  See application file for complete search history.

(56) References Cited

U.S. PATENT DOCUMENTS

| | | | |
|---|---|---|---|
| 3,505,698 A * | 4/1970 | van der Schoot | A01K 43/005 15/3.13 |
| 3,770,107 A * | 11/1973 | Michelbach | B65G 17/30 198/633 |
| 3,973,667 A | 8/1976 | Jellema et al. | |
| 4,199,051 A | 4/1980 | Kimberley | |
| 4,293,066 A | 10/1981 | Kennedy et al. | |
| 4,345,682 A | 8/1982 | White et al. | |
| 4,589,371 A | 5/1986 | Mas | |
| 4,750,229 A | 6/1988 | Poel et al. | |
| 4,985,956 A * | 1/1991 | van der Schoot | A01K 43/005 134/72 |
| 5,240,100 A | 8/1993 | Elferink et al. | |
| 5,279,254 A | 1/1994 | Dowty | |
| 5,673,649 A | 10/1997 | Duecker et al. | |
| 6,032,311 A * | 3/2000 | Nambu | A01K 43/005 134/131 |
| 6,732,851 B2 | 5/2004 | Wienken | |
| 6,883,528 B2 | 4/2005 | Kuhl | |
| 7,946,797 B2 | 5/2011 | Smith | |
| 8,127,916 B2 * | 3/2012 | Mix | A01K 31/165 198/801 |
| 9,038,812 B2 | 5/2015 | Wikkerink et al. | |
| 9,239,321 B2 | 1/2016 | Robinson | |
| 2009/0107801 A1 | 4/2009 | Smith | |
| 2011/0088994 A1 | 4/2011 | Wu | |
| 2011/0094858 A1 | 4/2011 | Mix | |
| 2014/0311862 A1* | 10/2014 | Von Der Assen | B65G 45/22 198/495 |

OTHER PUBLICATIONS

LF400—Flexx™ System brochure; www.alaso.com; 2 pages; Jan. 1, 2013.

* cited by examiner

VERTICAL EGG WASHER AND DRYER SUCH AS INTEGRATED INTO AN EGG PROCESSING LINE

CROSS REFERENCE TO RELATED APPLICATIONS

The present application claims priority of U.S. Ser. No. 62/790,638 dated Jan. 10, 2019.

FIELD OF THE INVENTION

The present invention relates generally to egg processing lines and related assemblies, such including any of egg washing and drying stations which are typically located between an egg inlet/orienting station and any of downstream located egg packaging or egg breaking stations. More specifically, the present invention discloses any of an egg washer and/or an egg dryer which utilizes vertical conveying capabilities for, in combination, supporting and rotating/candling eggs during either of spray bar washing or air knife jet drying. The height extending direction of the vertical washer and dryer allows for utilization of the available open vertical space often existing within the interior of the egg processing facility, with the ability to utilize the vertical space contributing to reducing the overall horizontal and floor extending length of the processing line.

BACKGROUND OF THE INVENTION

The incorporation of egg washers and dryers into an egg processing line is well known in the art. An example of this is shown in U.S. Pat. No. 9,239,321, to Robinson, for an Advanced Egg Breaking system. Other examples include the egg washer with multiple vertical spaced tiers of conveyors depicted in Kuhl, U.S. Pat. No. 6,883,528. Jellema, U.S. Pat. No. 3,973,667 teaches a vertical egg transport assembly utilizing pairs of basket halves.

Other commercially known vertical egg conveyors are depicted in the Big Dutchman Egg Collection System. The Alaso LF400 Flexx System further teaches a plastic flex conveyor incorporated into a tiered egg laying operation.

A common issue with egg washers and dryers involves their floor space requirements as components of the egg processing line. In the instance of conventional horizontal conveying washers, a required washing cycle can often require a time interval of between a half minute to a minute of time, thus necessitating the washer be designed with a sufficient running length in order to adequately wash eggs in volume as they are continuously conveyed between the egg inlet/orientation station and downstream located sorting, breaking and/or packaging stations.

Similar issues are encountered in the design and dimensioning of horizontal conveying egg dryers, again in order to continuously advance and candle/rotate the eggs concurrent with individual sub-embodiments which include either a plenum/fan arrangement or a plurality of air jets (aka air knife patterns) being directed over the eggs as they pass through the dryer. This again requires an extending length, such as up to forty feet in instances, to accommodate the eggs at a reasonable rate of continuous conveyance. In combination with the required extending length of the washer, an overall length of the egg processing line can often exceed the available floor space of an egg processing facility.

SUMMARY OF THE PRESENT INVENTION

The present invention discloses a vertical washer or dryer, such as integrated into an egg handling operation. The vertical washer or dryer includes a vertically extending body supporting a carousel conveyor adapted to support pluralities of eggs during transport in successive ascending and descending fashion within the body between an inlet location and an outlet location of the body.

A first egg conveyor communicates the eggs with the inlet location of the carousel conveyor, a second egg conveyor communicating the eggs with the outlet location. A least one of a plurality of egg washer spray bars or, in the separate variant, a plurality of egg dryer air knives, are integrated into the body in communication with the carousel conveyor for washing/drying the eggs while supported upon the carousel conveyor.

The carousel conveyor can further include a plurality elongated and width extending support bars having an arcuate receiving surface adapted to receive the eggs at the inlet location and to unload the eggs at the outlet location. The support bars can each further include a plurality of laterally spaced arcuate supports defining the arcuate receiving surface.

Opposite ends of each of the arcuate supports can further include inwardly turned abutments to prevent the eggs from falling off of the support surfaces. Pluralities of fixed fingers are further positioned at each of the inlet and outlet locations in order to transition the eggs from the first conveyor and, subsequently, to the second conveyor.

The fixed fingers may further extend at an angled and inter-meshing configuration and in an offset and alternately spaced fashion with the plurality of laterally spaced and arcuate supports of the elongated arcuate support bars. The inlet/outlet fixed transition fingers also include a widened receiving platform spaced from a location of the inwardly curled end abutments of the individual arcuate egg support surfaces to prevent the support bars from contacting the fixed transition fingers.

Additional features include upper and lower pairs of pulley for supporting the carousel conveyor. A continuous chain or belt is provided for supporting the support bars, these further including any of a plastic or other non-corrosive material.

Other features include either of the plurality of egg washer bars or egg dryer air knives being integrated into panel doors of the body, these facing the respective ascending and descending sides of the carousel conveyor. The arcuate receiving surfaces each further include a "C" shaped profile for supporting the eggs during conveying and candling/rotating upon said support profile between the inlet and outlet locations.

Segregating walls can be incorporated into each of the support bars in laterally spaced apart fashion between the support surfaces to prevent eggs from axially traversing along the support surfaces, and specifically to prevent eggs from laterally displacing at a speed sufficient to fracture adjoining supported eggs. A drain or reservoir can be positioned beneath the body in a washer application.

In either variant, a motor and drive is provided for controlling a speed of the carousel conveyor. A paddle wheel transfer is also provided for controlling an egg exit speed. Also, a separation screen segregates eggs supported on the ascending side of the carousel conveyor from those on the descending side.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
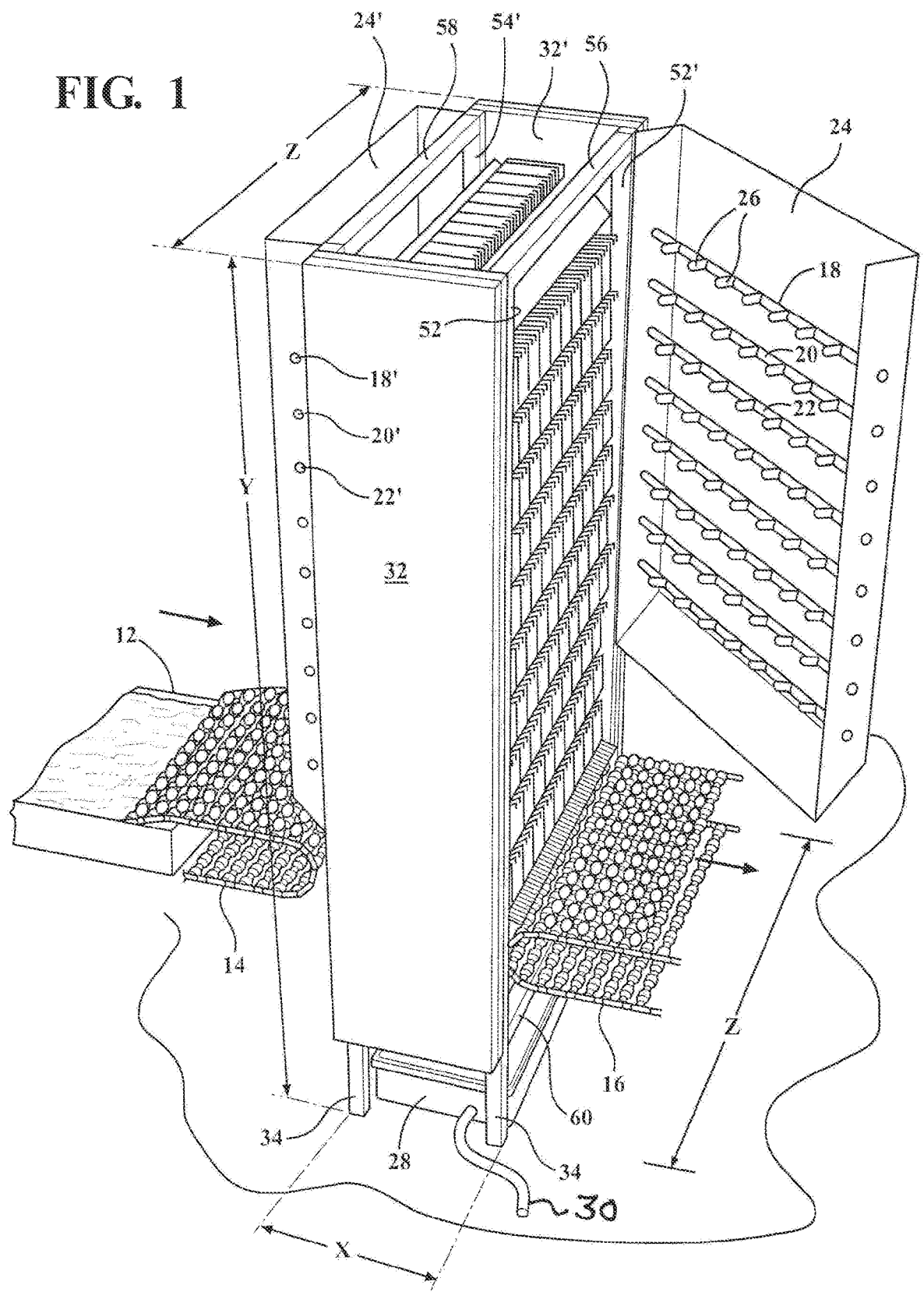
FIG. 1 is a perspective view of an example of a vertical washer provided according to one non-limiting variant of the present invention and including a representation of a pre-wash egg soaker in combination with both inlet and outlet spool bar conveyors and an array of spray bars configured in vertically tiered fashion in cooperation with an inside door panel.

With reference to FIGS. 1-18, the present invention discloses a vertical egg conveying station, such being provided as an appliance or equipment incorporated into an egg transfer or processing operation. The vertical egg conveying station can be provided as either of an egg washer (FIG. 1), with FIGS. 7-8 further disclosing alternate sub-variant of a corresponding egg dryer operation). The vertical egg washer is generally shown at 10 in FIG. 1, for cleaning of multiple eggs associated with an egg handling operation. As previously described, the vertical washer/dryer variants disclosed herein substitute for traditional linear extending egg washers and dryers which, when factoring in the required processing time and (continuous) conveyor speeds required for adequately washing or drying eggs, can often require the modular station (exclusive of conveyors and the like) to have linear extending lengths of forty to fifty feet or more, such that traditional egg handling operations can establish overall lengths of hundreds of feet.

Referring again to FIG. 1, perspective view 10 is again shown of an example of a vertical washer provided according to one non-limiting variant of the present invention and which includes a representation of a pre-wash egg soaker 12 in combination with both inlet 14 and outlet 16 spool bar conveyors. The soaker 12 is depicted representatively and is understood to include any type of fluid immersive station within which the dirty eggs can be submerged or passed through utilizing any type of continuous spool bar or chain drive. The concept behind the soaker is to loosen dirt and contaminants on the egg for easier and more complete removal by the spray bar nozzles within the vertical (ascending/descending) washer cabinet. It is further understood that, in the additional or alternate application of the egg dryer, a preceding soaker station would not be needed however it is envisioned that both of vertical washer and subsequent dryer stations can be combined/ganged together in combination with the pre-soaker station 12 and the suitable combination of conveyors 12, 14, et seq. extending from the initial egg accumulator/orientation station (not shown) and downstream egg breaking or packaging stations (also not shown).

As further previously described, and without limitation, the present invention is contemplated to include any similarly constructed vertical conveying washer or dryer which provides reduced running lengths (defined as a distance "x" as depicted by indicated axial arrow) in favor of additional height extending distance (see distance "y") for utilizing the vertical space existing between normal conveying heights and the facility ceiling, and along with depth or width dimension (distance "z") representing a given number of lanes associated with the spool bars or other constructed conveyors.

As will be further described in further detail with reference to the succeeding illustrations, also depicted in FIG. 1 is an array of egg treatment spray bars 18, 20, 22, et. seq., which are configured in horizontally extending and vertically spaced/tiered fashion, such as in cooperation with an inside surface of a pivotally supported and depth defining door panel 24 which forms part of the frame and cabinet structure for the washer. As shown, the spray bars include individual spray nozzles (see as shown at 26 in laterally spaced fashion with respect to selected spray bar 18 in each of FIGS. 1 and 7-10).

Without limitation, the egg treatment spray bars are further understood in alternate arrangements to be positioned in vertically extending and horizontally spaced fashion within the panel doors. It is also understood that the spray bars can be substituted by other structures, such as which can be integrated into the door panel interior, and which effectuates even spray distribution across the interior of the washer cabinet and into contact with the tiers of supported eggs.

Arrays of spray bars are understood to be located within the cabinet doors on both the first ascending and second descending sides (this further represented by additional spray bars 18', 20', 22' et seq. incorporated into the first or ascending side positioned door 24' of the cabinet in FIG. 1). A fluid supply (not shown) is provided for communicating any fluidic/water based cleaning composition, such as which can include any additives or ingredients (including without limitation soap, chemical disinfectants and the like) for cleaning the eggs as they are carousel conveyed and candled/rotated through the vertical washer. Any type of lower fluid/drain collection reservoir, such as which is generally represented at 28 and which can include a drain outlet 30 for emptying flow through collected fluid from the washer interior.

In this fashion, the eggs are sprayed by multiple nozzles upon being acquired on the inlet side, with a water heater component (not shown) also being provided for tempering the eggs, this defined as raising the egg temperature from storage temperature to an elevated washing temperature in order to reduce instances of cracking of the shell. The arrays of spray bars within the covers or doors 24/24' further provide for ease of access and cleaning on both the inlet/acquisition and outlet/depositing sides shown in FIG. 1.

The supporting cabinet or frame structure, such as which includes the pivotal and hinged supported doors 24/24' as well as opposite depth and height defining sides 32/32' can also be constructed of a suitable rust or corrosion resistant material. Without limitation, the cabinet construction can also include any of a stainless steel or possibly a durable plastic (e.g. nylon) which provides the necessary properties for supporting the weight of the interior mechanical and conveying structure along with the necessary corrosion resistant properties. Also shown are pedestal or foot supports 34 for supporting the vertical washer (or dryer) in the manner shown.

As previously described, it is also understood that a dryer variant of the invention can substitute the spray bars 18, 20, 22, et seq. with air knives which can be likewise integrated into each of the ascending and descending side doors 24/24'. Similar to the spray bars, the air knives can also be in non-limiting fashion be represented by elongated and width or height extending elements. A compressed air source, such as which can include a heater, can be provided for directing continuous flows of (heated) air across the tiered supported and rotated/candled eggs during their carousel travel between the inlet 14 and outlet 16 conveyors.

Figure 11:
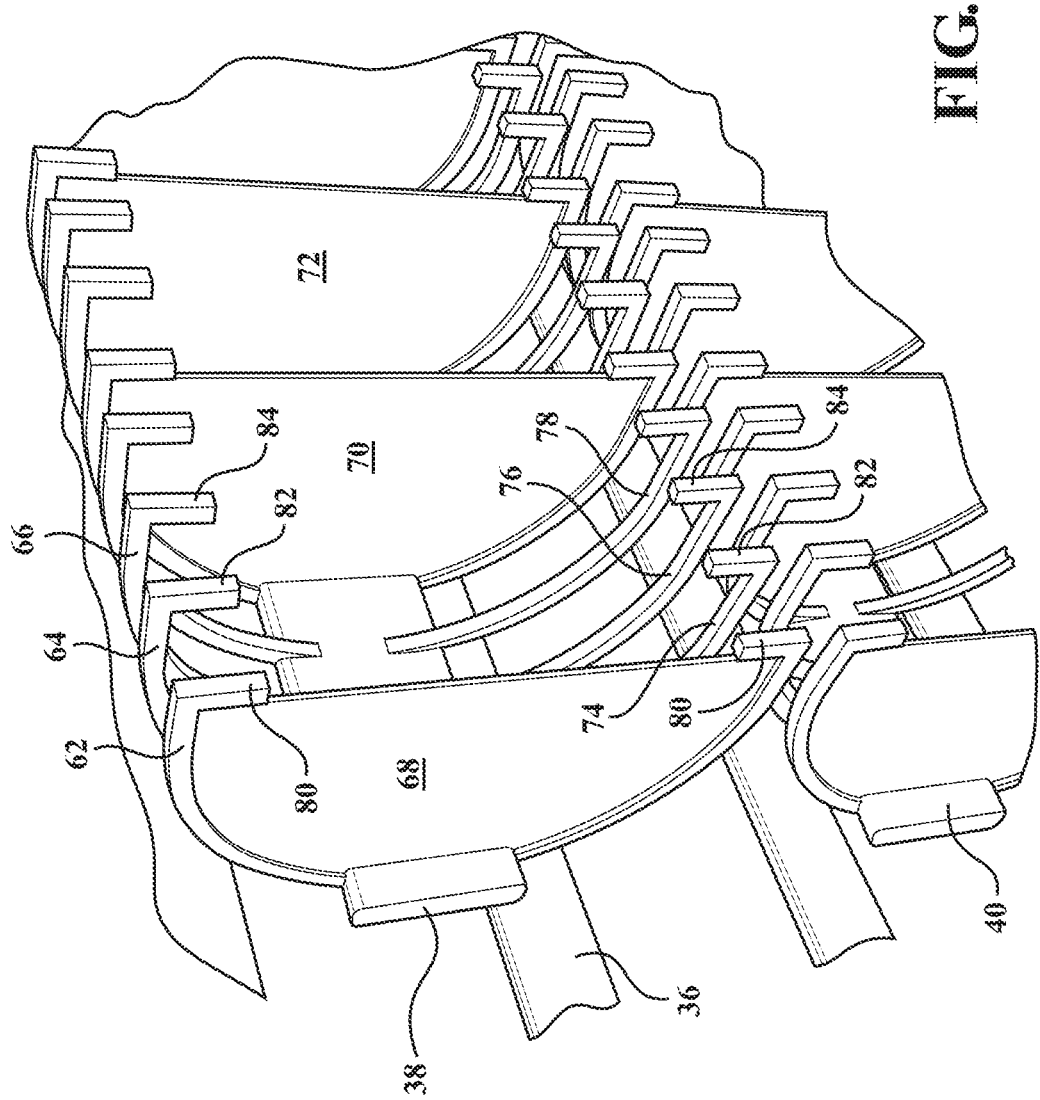
FIG. 11 is an enlarged partial illustration of a tiered array of the vertically carousel arrayed and elongated "C" shaped egg support/candling bars and which further illustrate segregating walls for preventing eggs from axially traversing along the "C" shaped support surface, and specifically to prevent such eggs from laterally displacing at a speed sufficient to fracture adjoining supported eggs.
Figure 12:
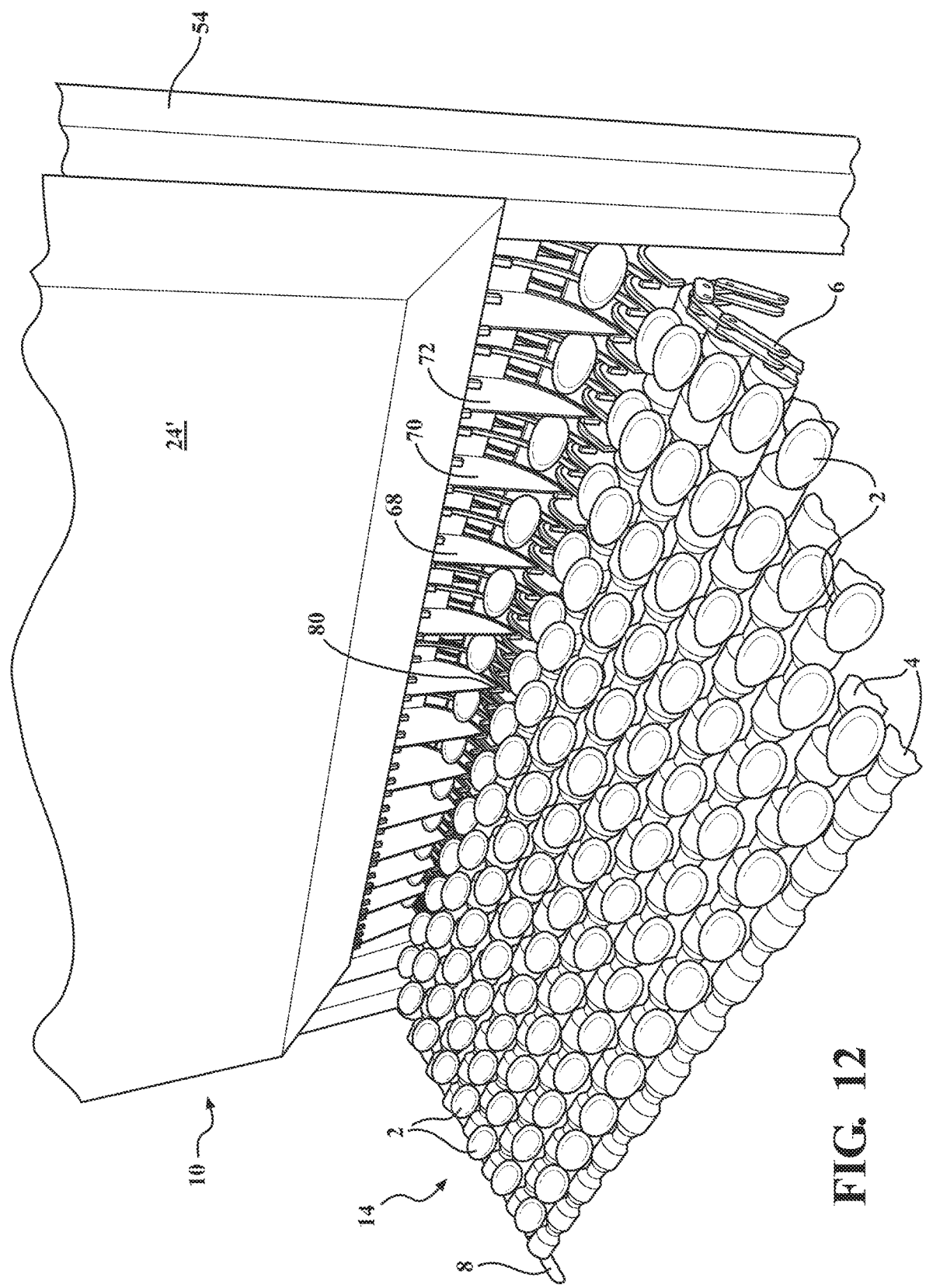
FIG. 12 is an illustration in perspective consistent with either of an inlet/acquisition or outlet/retrieval position of the spool bar conveyors (FIG. 1) and for transitioning eggs both from the inlet spool bar conveyor onto the "C" shaped elongated candling support bars of the vertical washer, as well as for depositing the fully carousel displaced egg at a proximal bottom extending location onto the outlet spool bar conveyor.

Jumping ahead to FIG. 11, an enlarged partial illustration is shown of a tiered array of the vertically carousel arrayed and elongated "C" shaped egg support/candling bars, see at 36, 38, 40, et seq. As further shown when viewing FIGS. 1 and 18 in combination, the elongated support/candling bars 36, 38, 40, et. seq., each include a width extending base support bar or strip which is mounted in horizontally extending fashion between a pair of pulley mounted belts other carousel traversing supports (one of which is shown at 42 in FIG. 18). The "C" shaped bars can also be constructed from plastic or another suitable material and, as further described, which are driven vertically by a suitable motor driven pulley/drive chain arrangement.

Figure 17:
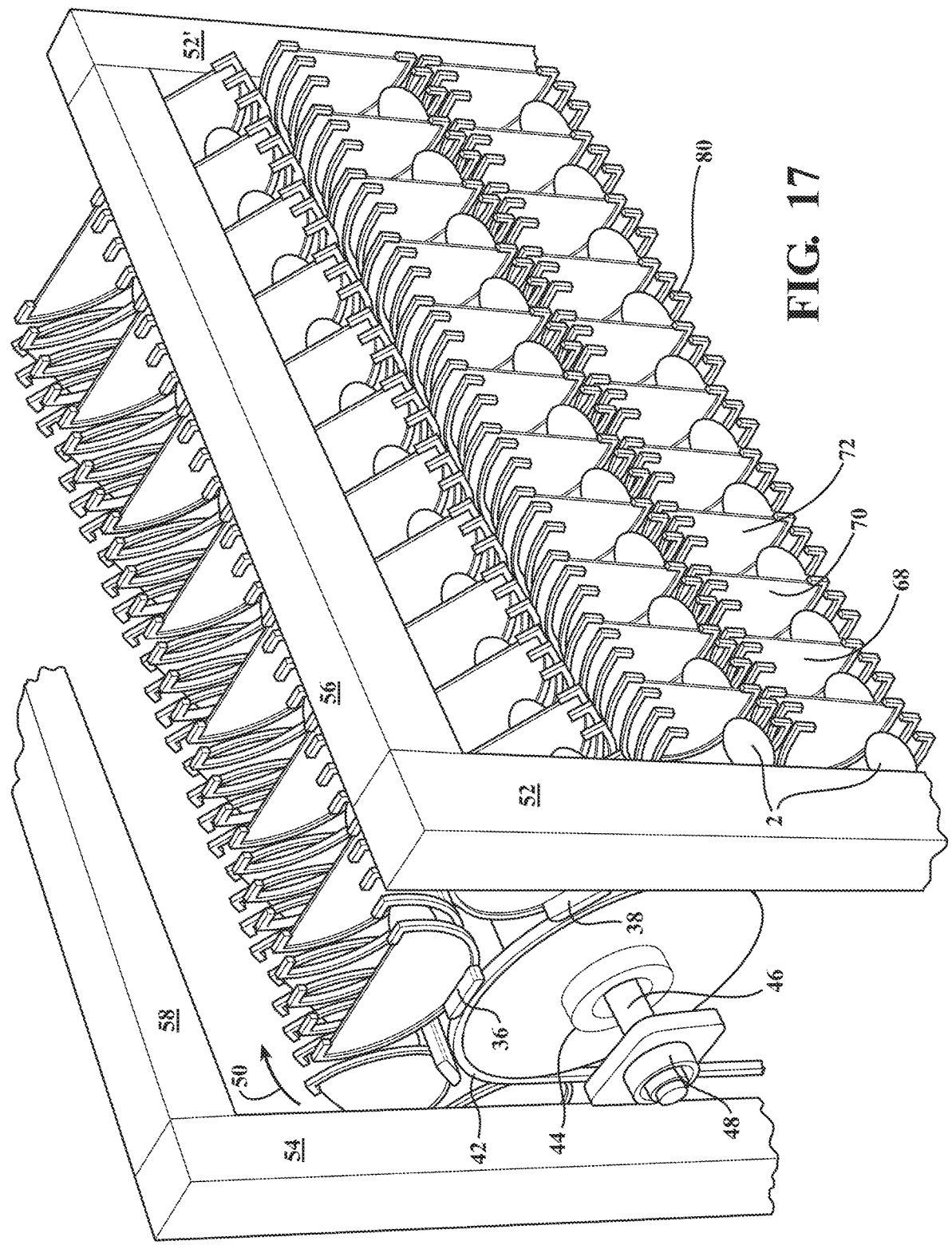
FIG. 17 is an enlarged upper end perspective of the vertical washer of FIG. 1 with the outer cabinet removed and better showing the three dimensional array of the elongated "C" cross sectional shaped support bars for safely retaining and candling/rotating the eggs during each of successive upward, over/across and downward directed motion and for ensuring even application of the washer nozzles integrated into the spray bars.

The pulley belts are in turn supported in traversing fashion about pulley wheels (an upper one of which is shown at 44 in FIG. 17). The pulley wheels 44 (both upper and lower width spaced apart pairs which are mounted to opposite sides of the frame structure) are supported via width extending shafts 46 journaled within end support bearing mounts 48. Although not shown, a motor with suitable gear or chain drive mechanism is incorporated into the washer assembly in order to continuously convey the plurality of elongate width extending "C" cross sectional shaped support bars in a continuous carousel direction depicted by directional arrow 50 in FIG. 17.

Also best shown in FIG. 17, in combination with FIG. 1 is a better depiction of the frame structure for supporting the cabinets (doors 24/24', sides 32/32') and which includes side vertical supports or beams 52/54 (these terminating at bottom end pedestal supports 34 depicted in FIG. 1). Interconnecting upper end frame supports 56/58 are also shown and, in combination with bottom end supports (one of which is shown at 60 in FIG. 1) provide the necessary structural support for the various components of the washer assembly.

As shown throughout the several views of the present illustrations, the elongated bars are configured to each include individual pluralities of spaced apart and "C" shaped (arcuate) beam supports, these shown at 62, 64, 66, et. seq. in FIG. 11 for selected support bar 38. Each of the support bars further illustrate segregating walls, see at 68, 70, 72, et seq. again for bar 38, which preventing eggs from axially traversing along the "C" shaped support surface, and specifically to prevent such eggs from laterally displacing at a speed sufficient to fracture adjoining supported eggs. Viewing FIGS. 10-11 collectively are depicted individual eggs 2 supported within each individual lateral pocket defined between each of the succeeding segregating walls 68, 70, 72, et seq.

Figure 10:
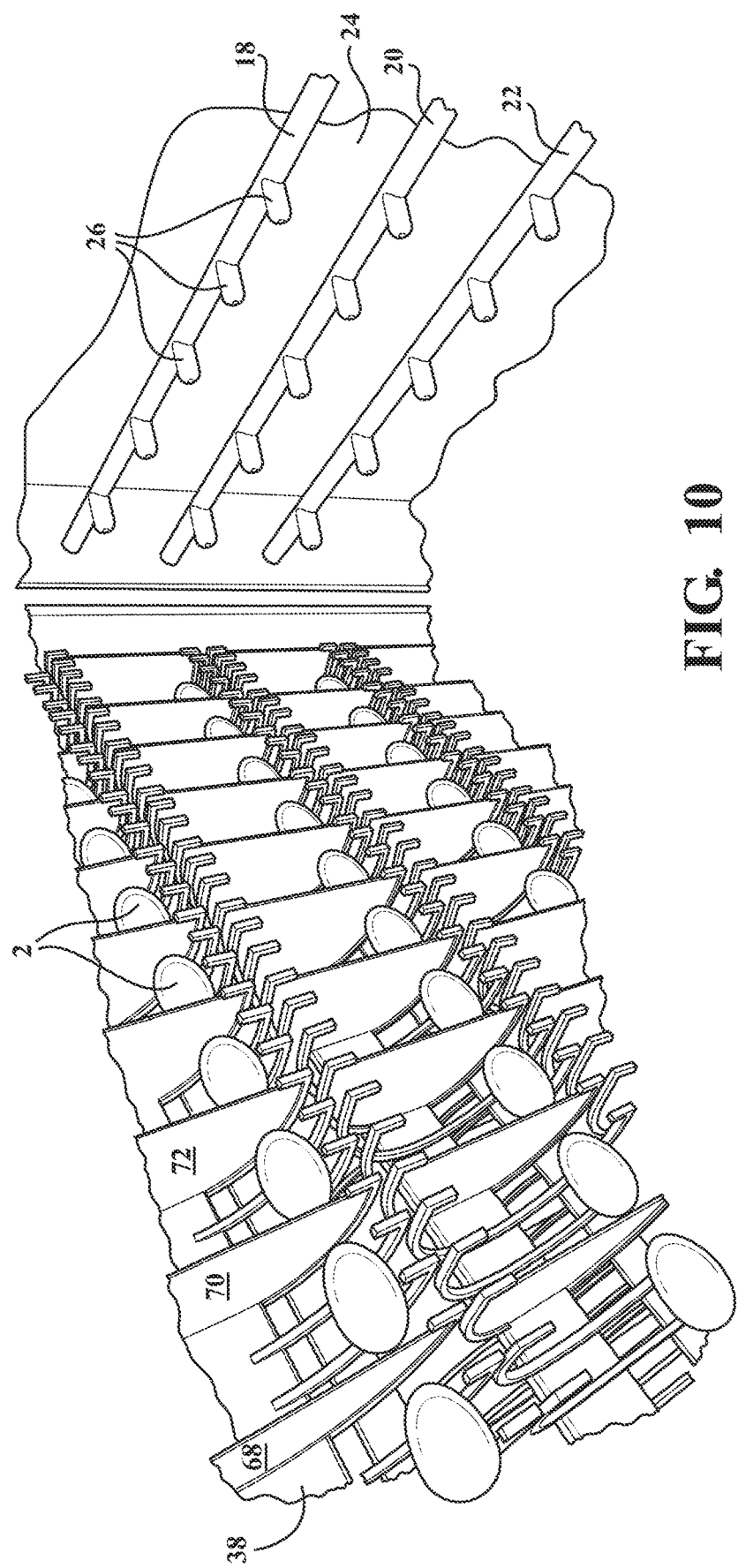
FIG. 10 is a perspective illustration of a vertical washer similar to FIG. 1 and depicting multiple tiers of eggs supported upon the individual "C" cross sectional shaped and vertically carousel candling bars in combination with the washer spray bars incorporated into the interior of the panel door.
Figure 16:
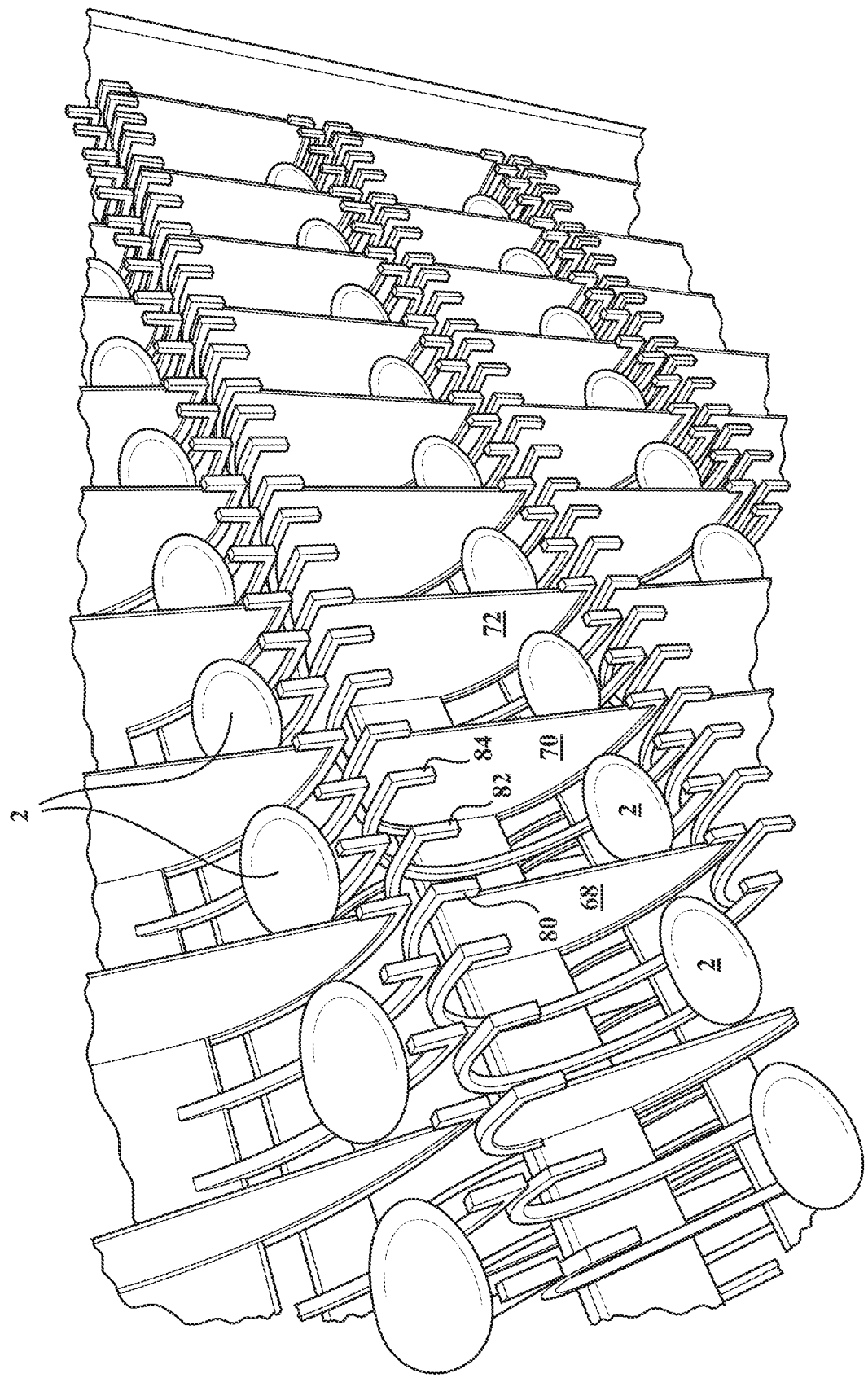
FIG. 16 is a further illustration similar to FIG. 11 previously described and again showing the segregating walls for isolating individual eggs and preventing any of the eggs from laterally/axially traversing along the "C" shaped support surface into adjoining supported eggs.

FIG. 16 is a further illustration similar to FIG. 11 previously described and again showing the segregating walls for isolating individual eggs and preventing any of the eggs from laterally/axially traversing along the "C" shaped support surface into adjoining supported eggs, with FIG. 17 depicting is another overhead perspective illustration similar to that shown in FIG. 10 and FIG. 17 further showing an enlarged upper end perspective of the vertical washer of FIG. 1 with the outer cabinet removed and better showing the three dimensional array of the elongated "C" cross sectional shaped support bars for safely retaining and candling/rotating the eggs during each of successive upward, over/across and downward directed motion and for ensuring even application of the washer nozzles integrated into the spray bars.

Returning to as best shown in FIG. 11, the configuration of the individual C bar beams 62, 64, and 66, et seq., can include either of a flattened inner arcuate surface profile (see as shown at 74, 76, 78, et seq.) upon which the eggs (see at 2 throughout the several figures) are supported. Alternatively, the inner arcuate edges of the "C" bars can include a tapered or thinner cross sectional shaped inner edge upon which the supported/candled egg 2 rests.

An advantage of narrowing the cross sectional contact/support inner edge of each of the arcuate bars 74, 76, 78 further serves provide more access to the surfaces of the egg shell for cleaning. In a related dryer variant, the narrowing of edges 74, 76, 78, et seq. alternately functions to prevent moisture retention from the underside contact location of the eggs (such being endemic in the instance of wider contact surfaces with the egg shell associated with traditional spool bars supporting the eggs during traversing through conventional horizontal washer or dryer assemblies). As again best shown in FIG. 11, the opposite ends of the individual "C" shaped beams 62, 64, 66, et seq. further include inwardly turned abutment ends (see pairs 80, 82, 84, et seq. in FIG. 11) which prevent the supported/candled eggs from falling out of the candling bar pockets defined between the individual support walls 68, 70, 72, et seq. and during the rotational cycle of the eggs as they are carousel displaced around the vertical washer/dryer via the pulley drive mechanism.

Figure 3:
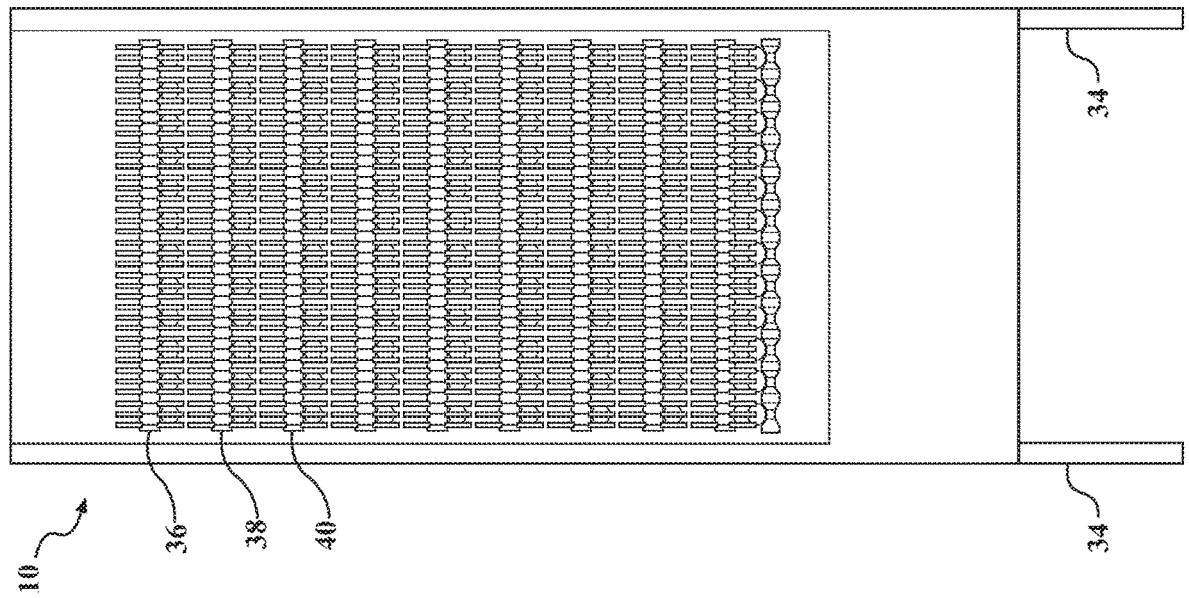
FIG. 3 is a front plan view of the washer with the spray bar integrated door panel removed.
Figure 4:
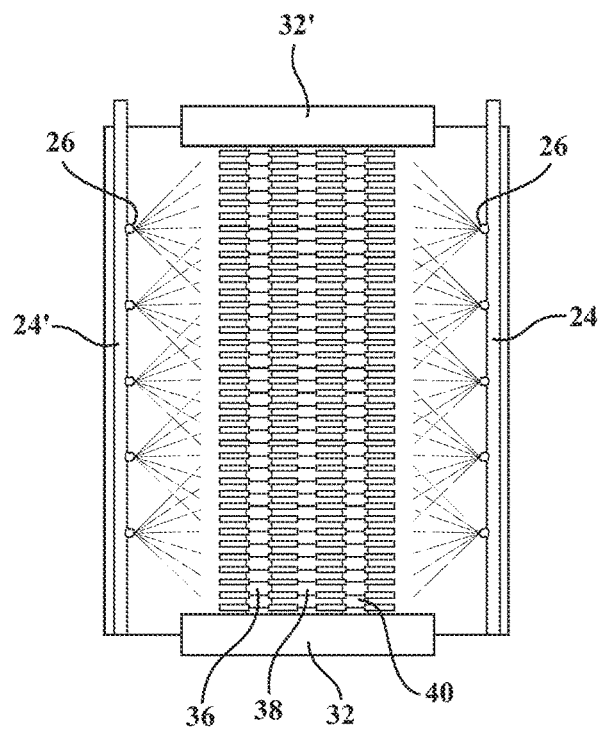
FIG. 4 is a top view of the vertical washer in which a pair of opposite side and spray bar supporting door panels are shown in a closed position.
Figure 6:
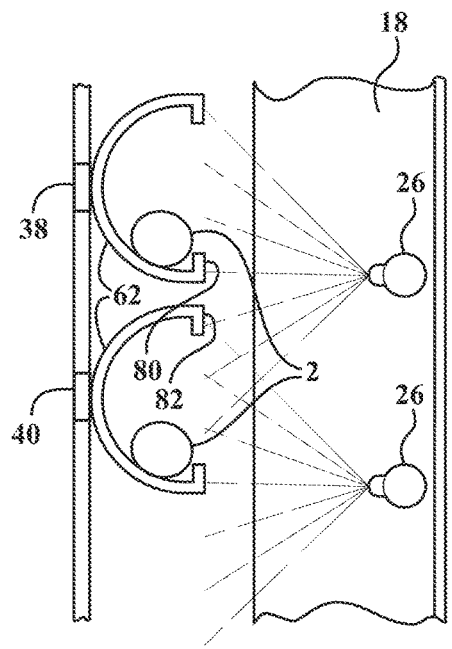
FIG. 6 is an enlarged partial view of a vertical carousel array provided by "C" cross sectional shaped and elongated egg supporting/candling bars.
Figure 5:
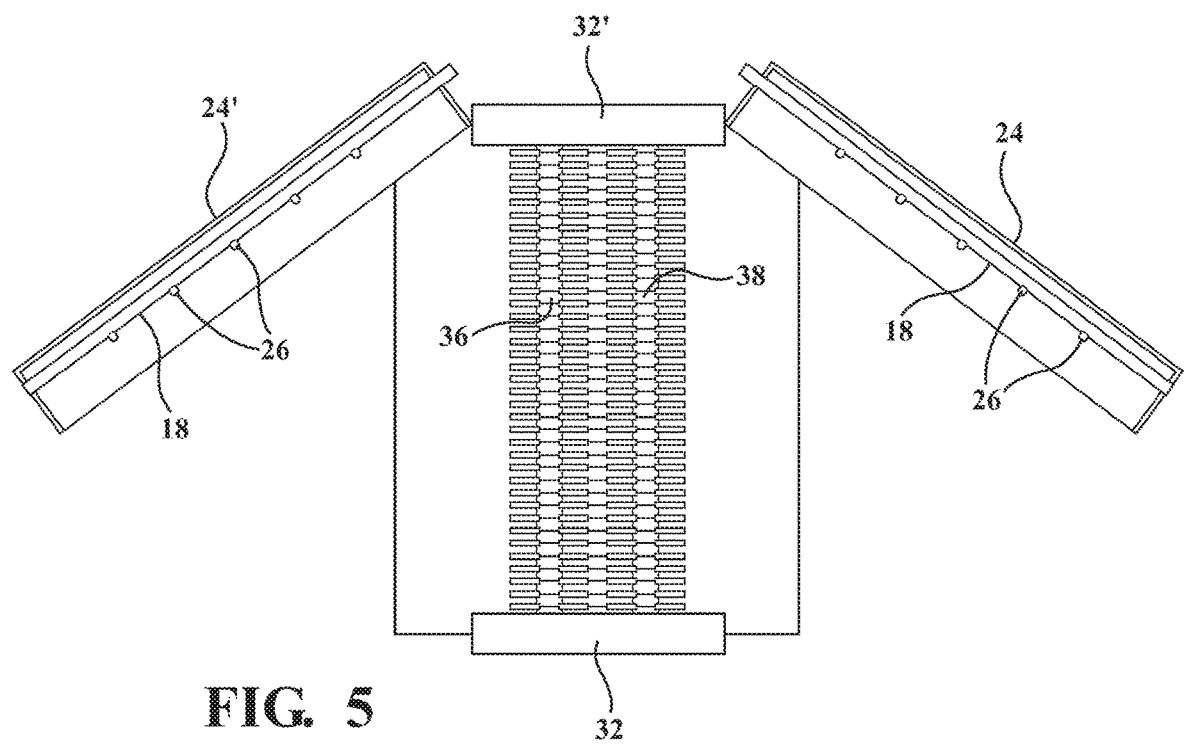
FIG. 5 is a succeeding top schematic view to FIG. 4 and depicting the spray bar supporting door panels depicted in an open position.

Addressing the schematic views of FIGS. 2-6, FIG. 2 is a side schematic view of the vertical washer shown in FIG. 1, with FIG. 3 illustrating a front plan view of the washer with the spray bar integrated door panels removed. FIG. 4 further provides a top view of the vertical washer in which the pair of opposite side and spray bar supporting door panels (again at 24/24') are shown in a closed position. FIG. 5 is a succeeding top schematic view to FIG. 4 and depicting the spray bar supporting door panels depicted in an open position, Finally, FIG. 6 provides an enlarged partial view of a vertical carousel array provided by the "C" cross sectional shaped and elongated egg supporting/candling bars (shown again at 38 and 40. The end abutments 80 and 82 are again shown which provide support to the eggs 2 as they are candled/rotated about the "C" cross sectional inner arcuate profile of the elongate extending candling bars between the inlet conveyor 14 and outlet conveyor 16.

Figure 2:
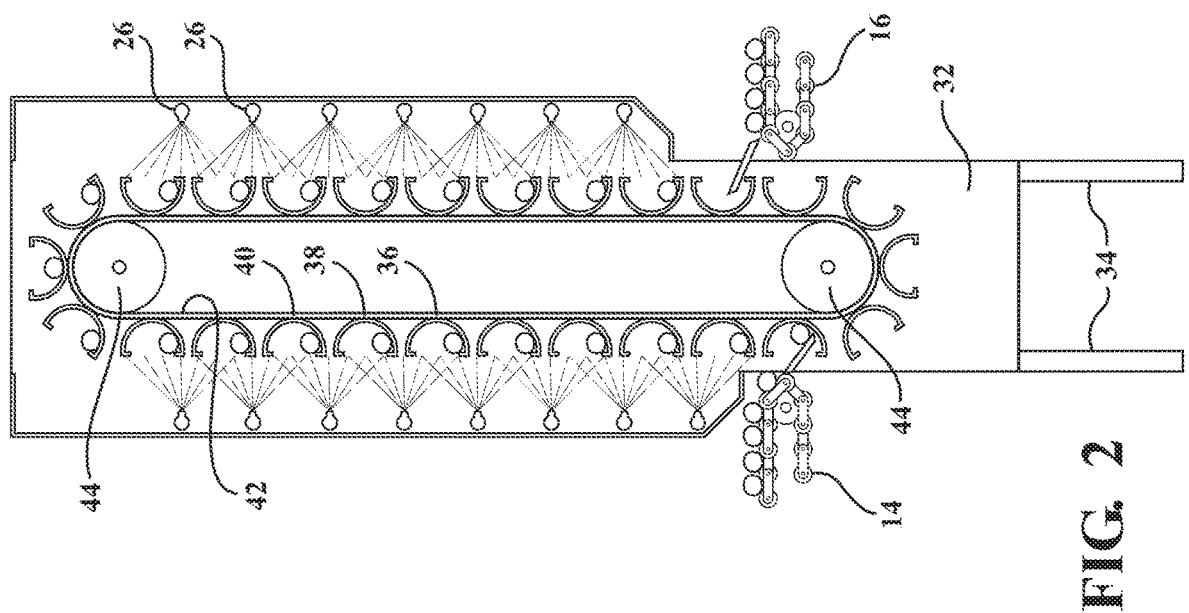
FIG. 2 is a side schematic view of the vertical washer shown in FIG. 1.
Figure 9:
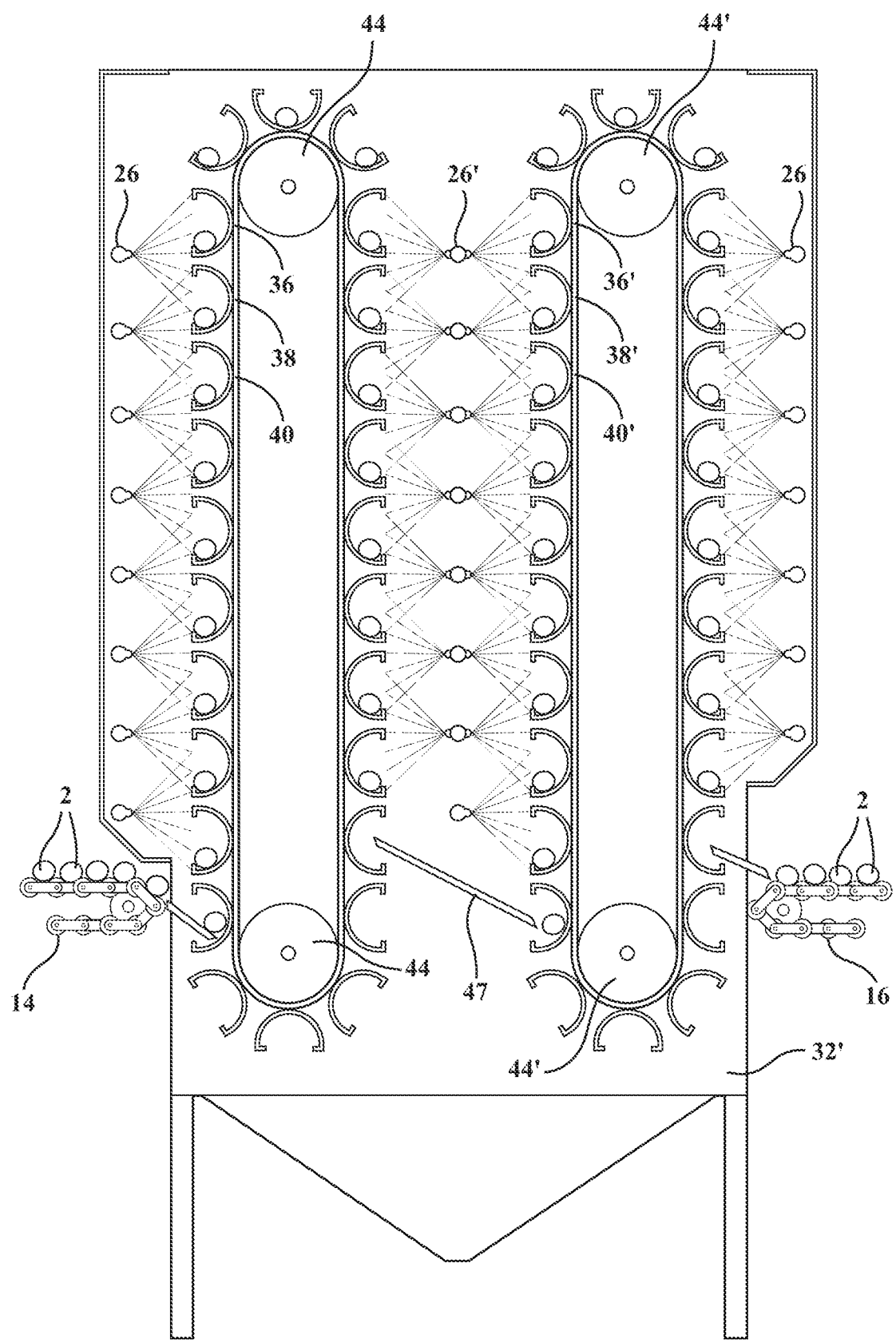
FIG. 9 is a plan cutaway of a dual vertical conveyor variant of an egg washer in comparison to that shown in FIG. 2.

FIG. 9 is a plan cutaway of a dual vertical conveyor variant of an egg washer according to a further variant, in comparison to that shown in FIG. 2, and which depicts a pair of tandem carousal type conveyors each including a closed loop plurality of egg candling bars, again at 36, 38, 40, et seq., as well as at 36', 38', 40', et seq. The conveyor in FIG. 9 operates according to the general principal disclosed in FIG. 2, with the inlet conveyor 14 depositing eggs upon the ascending side egg support bars 36, 38, 40 of the first conveyor, the eggs being subsequently deposited upon the outlet conveyor 16 via descending and the elongated support candling bars 36', 38', 40', et seq. of the second closed loop carousel.

Figure 14:
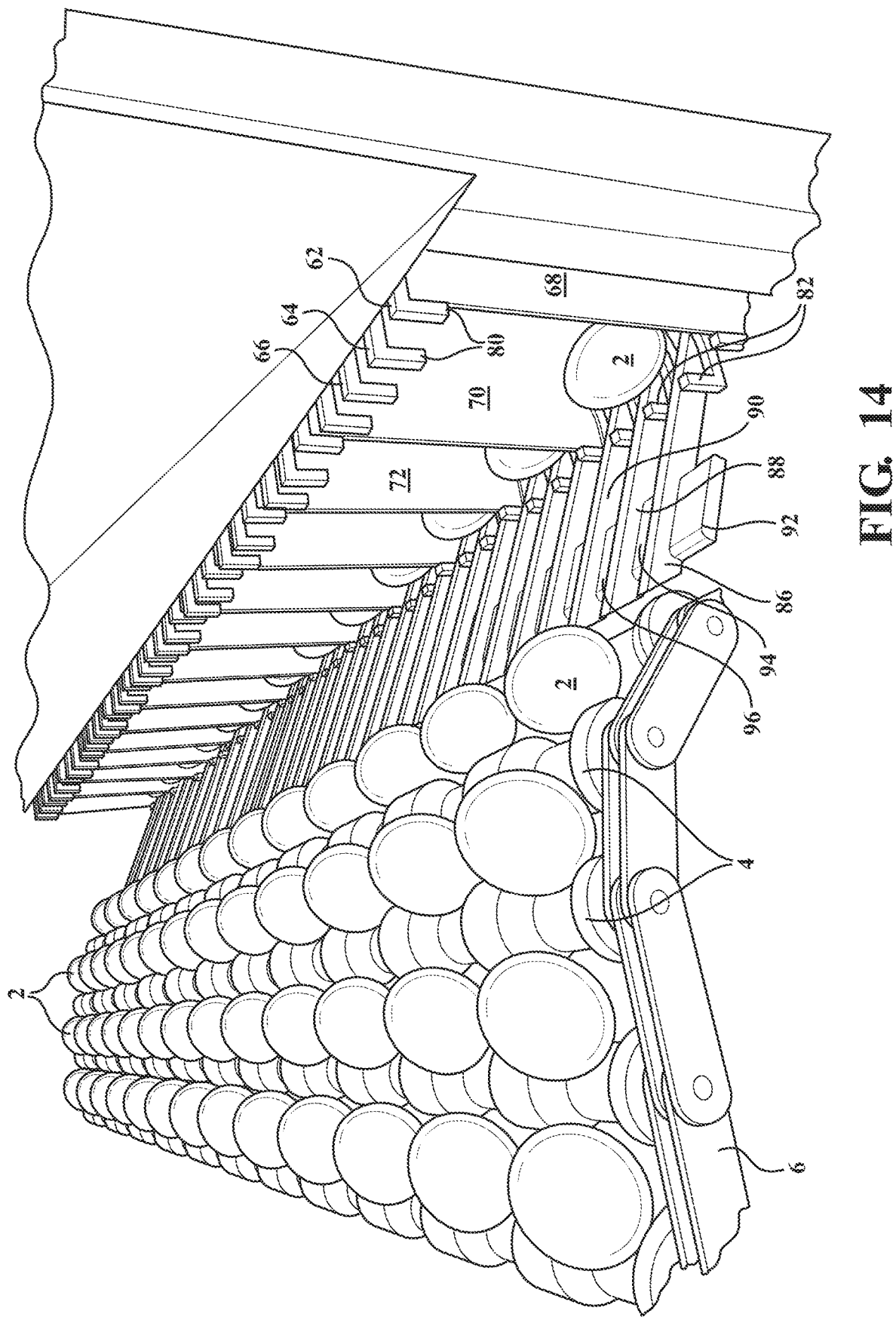
FIG. 14 is a further enlarged illustration depicting a plurality of loading/transition fingers which are positioned between the depositing edge of the inlet spool bar conveyor and an ascending/acquisition location of the elongated "C" shaped egg support/candling bars, the angular orientation and spacing of the fingers as shown further being such that the "C" shaped portions of the elongated bars pass between specified fingers, a reverse angular orientation of an outlet positioned array of unloading fingers, relative to the descending "C" bars and outlet conveyor, being such that eggs are returned after washing without breakage.

As further shown, a plurality of egg transfer ramps 47 (one of which is shown in plan view) are configured within the cabinet interior and positioned between each succeeding pair of individual "C" shaped egg support/candling bars located on either of the first carousal descending and second carousel ascending sides. Similar to the fixed transition fingers 86, 88, 90, et. seq. as best shown in FIG. 14 (described below), the fixed ramps 47 intercept the eggs 2 to transition them from the first to the second tandem carousel conveyors, the ramps 47 being angled to prevent the eggs from rolling at a speed beyond that which can ensure them being safely transferred from the first descending carousal egg supporting candling bars onto the second ascending carousel egg supporting candling bars.

Also depicted in FIG. 9 is a modified arrangement of spray wash bars and directed wash nozzles, see again at 26 on either side of the cabinet, see as further represented at 32'. Also shown is a further plurality of intermediate and bi-directional spray nozzles 26' which extending in likewise tiered fashion across an intermediate middle location of the cabinet between the carousels. It is also noted that the air dryer variants of FIGS. 7-8 can be similarly constructed with tandem positioned carousel conveyors (and by which the reconfiguration of the spray nozzles are substituted by either of air dryer bars or air knives a shown in each of FIGS. 7-8). In this manner, the dual carousel conveyor variant can allow for extended washing or drying cycles, beyond that possible with a single carousel type conveyor arrangement.

The views of the vertical washer shown in FIGS. 1, 2 and 10 depict multiple tiers of eggs supported upon the individual "C" cross sectional shaped and vertically carousel candling bars, with an overhead angle of the vertical washer (also again shown in FIG. 1) better showing the upper end carousel transition location for redirecting the individual "C" shaped elongated support/candling bars in a reverse/downward direction before depositing the eggs upon the outlet conveyor, again depicted in FIG. 1. As further depicted in FIG. 11, the inner supporting base or strip portions of each candling bar (see again at 36, 38, 40 in FIG. 11) is secured in part at opposite lateral ends to the pulley chain or belt (again at 42 in FIG. 18) for traversing the horizontally extending and vertically tiered plurality of candling bars so as to evenly wash/dry and candle the eggs between the inlet and outlet locations.

FIG. 10 again provides an enlarged sectional perspective of the vertically tiered and elongated "C" shaped support/candling bars, again as shown in FIGS. 1, 2 and 6 in combination with the washer spray bars incorporated into the interior of the panel door. The support aspect of the "C" shaped candling bars allows for rotating the eggs during carousel motion successively upward, forward and downward within the vertical washer cabinet and according to the methodology previously described.

Proceeding to FIG. 12, an illustration is provided in perspective consistent with either of an inlet/acquisition or outlet/retrieval position of the spool bar conveyors (see width elongated spool bars 4 which are associated with each of the looped inlet 14 and outlet 16 linkage conveyors FIG. 1) and for transitioning eggs both from the inlet spool bar conveyor (again at 14) onto the "C" shaped elongated candling support bars 36, 38, 40, et. seq. of the vertical washer, as well as for depositing the fully carousel displaced egg at a proximal bottom extending location onto the outlet spool bar conveyor (not shown in FIG. 12 but depicted again at 16 in FIG. 1).

Figure 13:
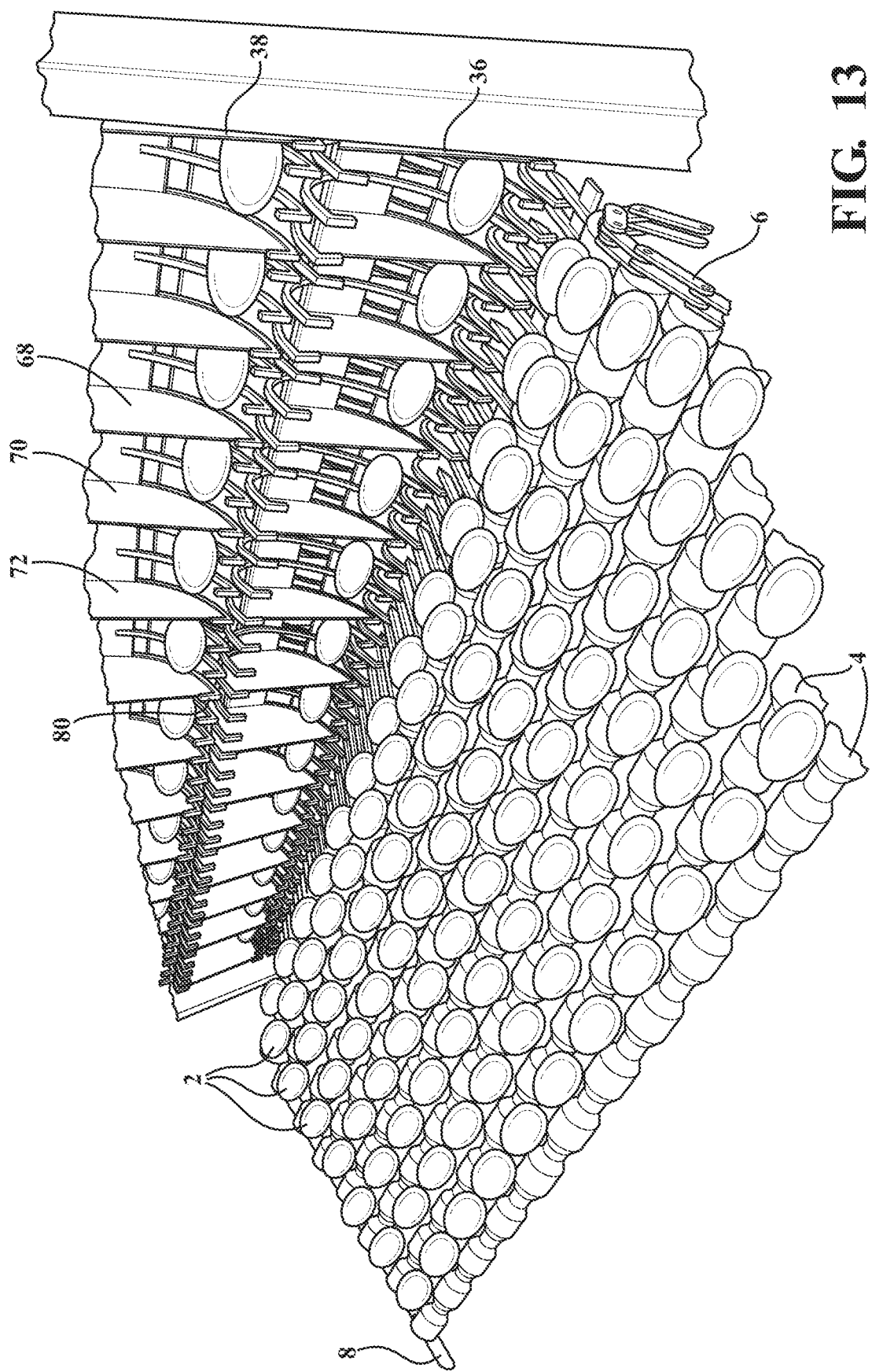
FIG. 13 is a further illustration of either an inlet/acquisition or outlet/deposit position for transferring eggs to and from the elongated "C" shaped candling bars via the inlet and outlet spool bar conveyor.

FIG. 13 is a further illustration of either an inlet/acquisition or outlet/deposit position for transferring eggs 2 to and from the elongated "C" shaped candling bars 4, via the inlet 14 and outlet 16 spool bar conveyors, each of these further understood to include an arrangement of the individual spool bars again shown at 4 which are supported between opposite end supported chain drives 6 and 8 according to known teachings.

FIG. 14 presents a further enlarged illustration depicting a plurality of loading/transition fingers, see at 86, 88, 90, et seq. which are positioned between the depositing edge of the inlet spool bar conveyor and an ascending/acquisition location of the elongated "C" shaped egg support/candling bars, the angular orientation and spacing of the arcuate egg support surfaces 62, 64, 66, et sq. as shown further being such that the "C" shaped portions of the elongated bars 36, 38, 40, et seq. are spatially arrayed relative to the fixed transition/acquisition fingers so that the eggs 2 pass between specified fingers. A reverse angular orientation of an outlet positioned array of unloading fingers is further provided (proximate outlet spool conveyor 16), relative to the descending "C" bars and outlet conveyor, this being such that eggs are returned after washing (or drying) in each of ascending and subsequent descending and without breakage.

The fixed transition fingers 86, 88, 90, et. seq. as best shown in FIG. 14 guarantee gentle handling and transition of the eggs 2 between each of the inlet and outlet transition locations with the continuous vertical carousel motion of the arcuate "C" pocket defining bars and at both the vertical ascent (inlet) and descent (outlet positions) by which the eggs are transitioned both to and from the individual "C" bars without damage thereto. During the transition motion between ascending and descending direction of the individual "C" bars (at the top of the washer/dryer) most of the egg candling/rotating occurs and which can be coordinated with the arrangement (direction and pressure) of either of the spray washer nozzles or air dryer knives which can be integrated into the assembly.

The inlet/outlet transition fingers can further each include a widened receiving platform (see at 92, 94, 96, et seq. for fingers 86, 88, 90 as shown in FIG. 14) which are spaced from the location of the inwardly curled end abutments 80, 82 of the individual "C" shaped egg capture support surfaces and to prevent the individual "C" bar configurations from contacting the fixed and alternately spaced transition fingers 86, 88, 90, et seq.

Figure 15:
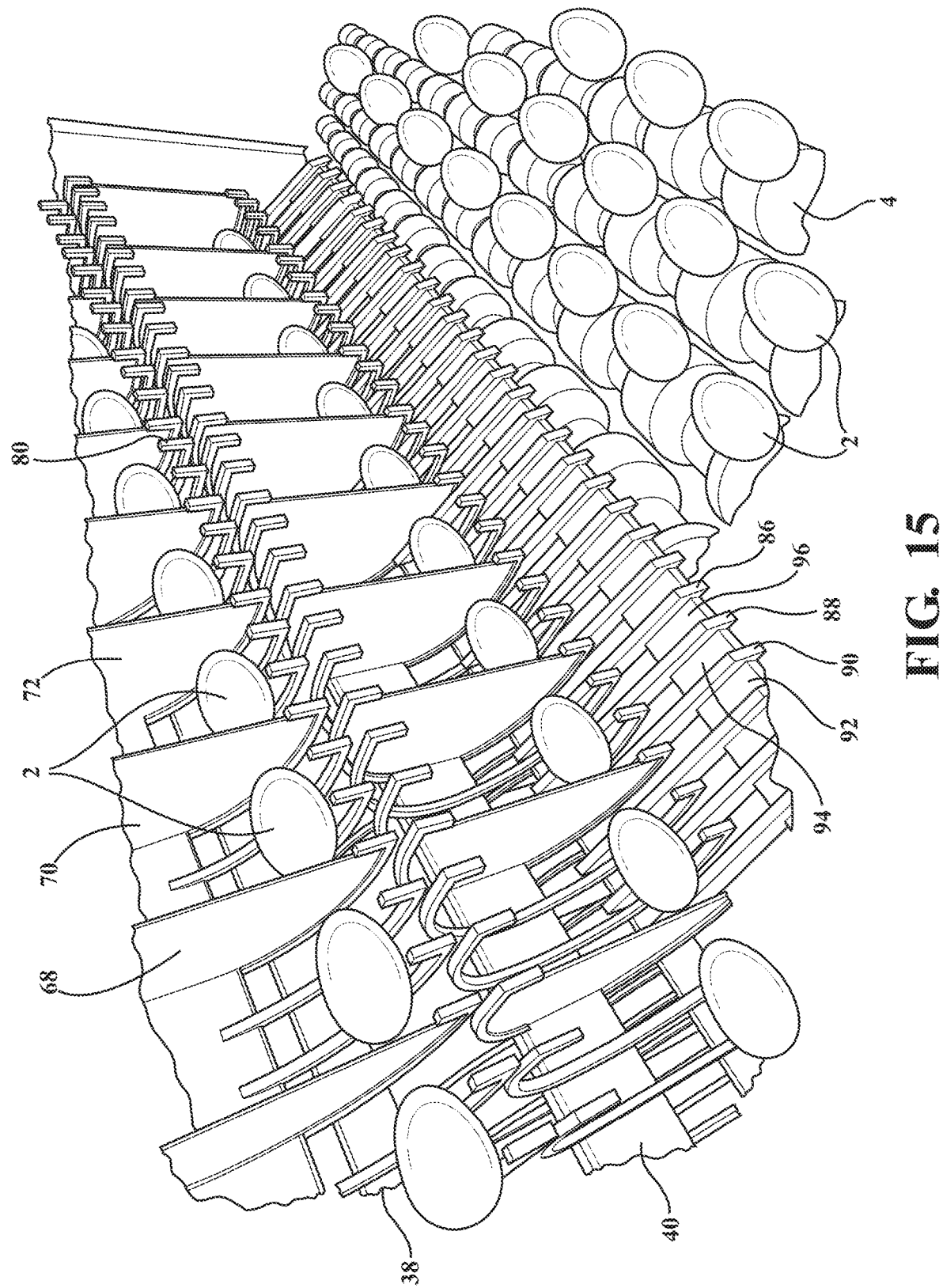
FIG. 15 is a further close-up view of the array of transition forks, such as which can be associated with the descending outlet/return location of the egg washer "C" bars.

As further shown, the fixed fingers further extending at an angled and inter-meshing configuration and in an offset and alternately spaced fashion with the plurality of laterally spaced and arcuate supports of the elongated arcuate support bars. FIG. 15 provides a further close-up view of the array of transition fingers, such as which can be associated with the descending outlet/return location of the egg washer "C" bars.

Figure 7:
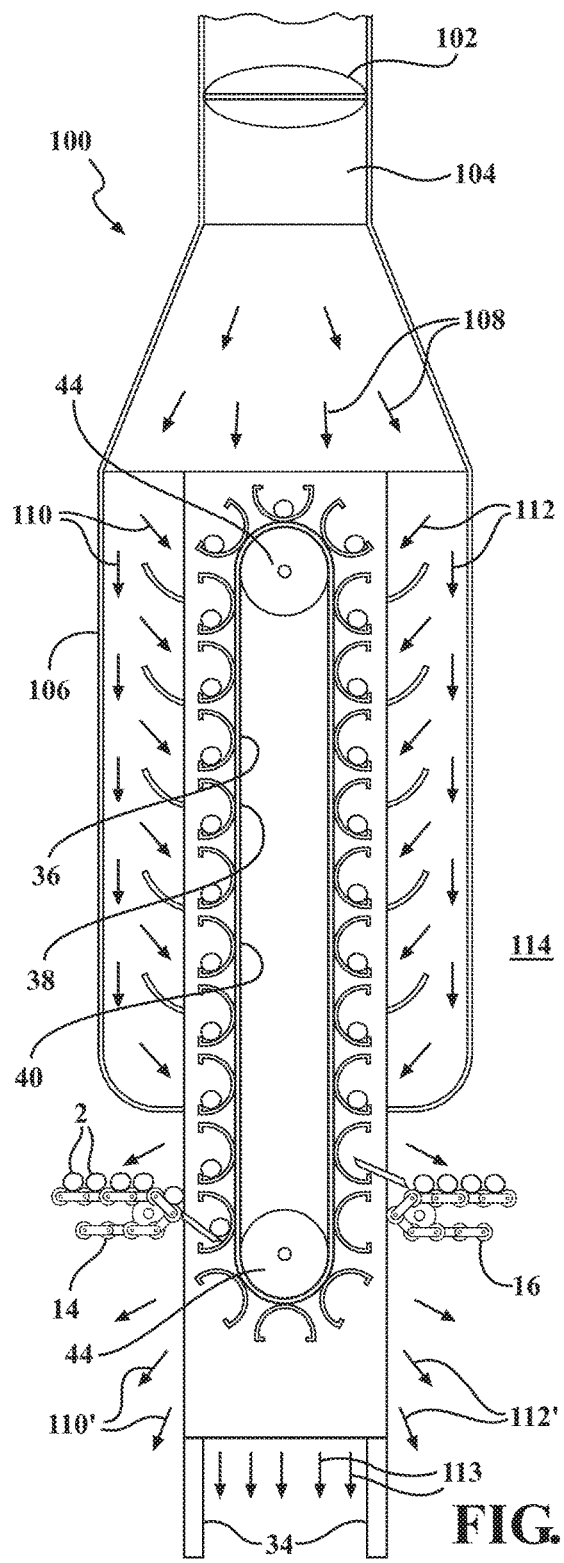
FIG. 7 is a side schematic view of a vertical dryer, similar to the washer variant depicted in FIG. 2, and illustrating a blower/fan generating component in combination with a plenum encasing the tiered rows of egg supporting bars for drying the eggs as they are progressively conveyed upwardly and then downwardly in carousel fashion.

With reference to FIG. 7, a side schematic view is shown at 100 of a vertical dryer, similar to the washer variant depicted in FIG. 2, according to a further variant of the present invention. The vertical dryer repeats many of the features associated with the vertical washer and, as illustrated, discloses similar structure which can be utilized for drying while vertically conveying the pluralities of eggs (such as after the eggs having gone through a similarly configured washer).

Although only illustrated in side cross section, the eggs are again understood to be conveyed upon similarly configured and width extending/vertically tiered egg supporting bars 36, 38, 40, et. seq., such further having a similar arcuate or modified elongated supporting/candling configuration exhibiting "C" shaped cradling profile which can be molded of plastic and connected to the associated side chains incorporated into the housing and in turn driven by the a suitable electric motor or the like. It is also understood that all common features shared with the washer variants of FIG. 1, including pluralities of inlet 14 and outlet 16 are repeated with respect to the dryer variant of FIGS. 7-8 so that reference will be limited to the various drying structures and techniques employed (plenum and fans in FIG. 7 versus air knives in FIG. 8).

Referring again to FIG. 7, the dryer 100 illustrates a blower/fan generating component (represented at 102) which defines an optional egg treatment device alternate to the washer spray bars of FIG. 1 and which introduces an airflow (which can be heated or ambient) such as in a vertically conveying fashion along a length of ductwork 104 in combination with a plenum 106. The plenum 106 encases the tiered rows of egg supporting/candling bars (again as shown at 36, 38, 40, et seq. in FIG. 11) along their entire extending lengths for drying the eggs as they are progressively conveyed upwardly and then downwardly in carousel fashion about the vertical conveyor between the respective inlet and outlet pluralities of spool conveyors (see again at 14 and 16 in FIG. 1).

The airflows generated by the blower and plenum as further depicted by directional arrows 108 located within the introduction zone of the ductwork 104 above the carousel conveyor, this splitting into separate width extending airflows on either of the inlet side (airflows 110) and outlet side (airflows 112), additional to bottom outlet airflow 113. The interior construction of the plenum 106 is further such that it can incorporate such as repositionable/orientable vanes (see as represented at 114) for optimally redirecting airflows against the eggs 2 as they are continuously carousel transported/candled between the inlet 14 and outlet 16 spool conveyors. In order to maintain a continuous airflow profile across the inlet and outlet sides of the plenum 106, these airflows outlet (see at 110' and 112') at lower communicating locations of the plenum.

Figure 8:
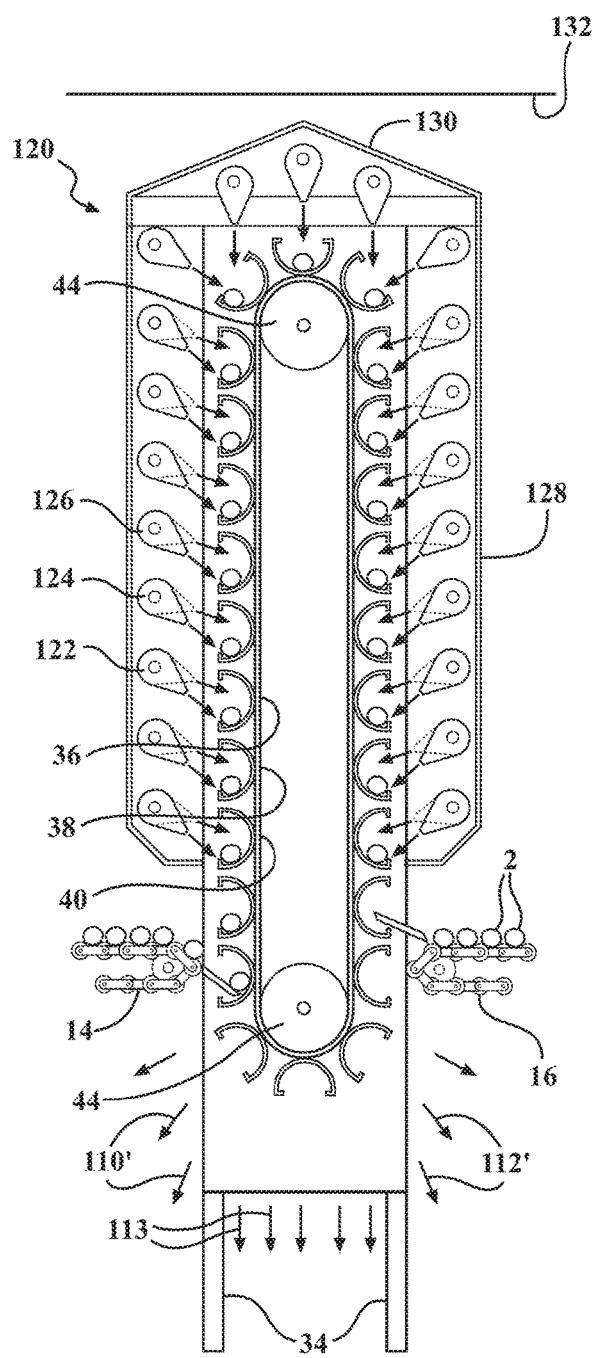
FIG. 8 is an alternate variant of vertical dryer to that shown in FIG. 7, and illustrating an arrangement of multiple and orientable air knives extending the width of each of the vertically tiered and elevating bars.

FIG. 8 presents an alternate variant, at 120, of a vertical dryer in comparison to that shown in FIG. 7, and illustrating an arrangement of multiple and orientable air knives (see at 122, 124, 126, et seq. on inlet side), and which extend the width of each of the vertically tiered and elevating and candling support bars 36, 38, 40, et seq. In comparison to the plenum 106 in FIG. 7, a reconfigured and enclosing housing is shown at 128 in FIG. 8 with a cover or cap 130, such further located a spaced distance below an interior ceiling 132 of the associated facility within which the vertical egg dryer (such as forming a component of an overall egg process line) is located.

The air knives represented in FIG. 8 are understood to operate in similar fashion to the spray bars in the vertical washer variant and are capable of being individually or collectively actuated and/or adjusted to optimize the delivery of targeted airflows in order to more efficiently dry the eggs as they are candled upon the arcuate supporting bars during carousel type traversing between the inlet and outlet locations of the vertical dryer. As shown, the individual air knives 122, 124, 126, et seq. can be arranged on both opposing sides as well as overhead of the carousel type conveyor in order to provide a consistent airflow over the eggs between pickup from the inlet conveyor spool bars 14 and drop-off or transfer to the outlet conveyor spool bars 16.

Additional considerations include the use of either of the spool bar conveyors as shown, as well as alternate conveyor belt operations extending to and from the inlet and outlet of the vertical washer/dryer. The spool bar conveyors can further range form such as three to eighteen spool bars wide.

Other considerations include the ability to control the exit speed of the eggs to the outlet conveyor 16, such as via a given paddle wheel transfer configuration. It is also understood that the ascent and subsequent descent of the eggs when supported within the vertical washer/dryer can include the provision of a separation screen (not shown) to prevent the water sprays on the ascent side (door 24') in the example of the vertical washer variant 10 from contaminating eggs 2 on the subsequent descent side (door 24).

As previously described, the configuration of the elongated egg support/cradling bars, such as which are connected to the driving chains in a tiered fashion and include any suitable plastic or like construction, can further include a narrowed or tapered point at the egg candling support surface (see again at 74, 76, 78, et seq. in FIG. 11), such providing for both more complete egg washing or egg drying as the egg is candled during carousel motion across the top of the conveyor and between the inlet and outlet sides. The use of a separation screen (as with the washer embodiment) can also be employed in both the ascending and descending sides and to prevent re-wetting of the eggs by water droplets blown off by the blower plenum or air knives.

Having described my invention, other and additional preferred embodiments will become apparent to those skilled in the art to which it pertains, and without deviating from the scope of the appended claims:

I claim:

1. A vertical egg conveying station, such as integrated into an egg handling operation, said station comprising:
    a body incorporating a vertically extending and carousel conveyor which is adapted to support pluralities of eggs during transport in successive ascending and descending fashion within said body between an inlet location and an outlet location of said body;
    a first egg conveyor communicating the eggs with said inlet location of said carousel conveyor and, a second egg conveyor communicating the eggs with said outlet location;
    a plurality of egg treating elements incorporated into said body in communication with said carousel conveyor; and
    said egg treatment elements further including a plurality of at least one of egg dryer bars and egg dryer knives integrated into said body in communication with said carousel conveyor for drying the eggs while supported upon said carousel conveyor.

2. The invention as described in claim 1, said egg treatment elements further comprising at least one of a plurality of washer spray bars integrated into said body in communication with said carousel conveyor for washing the eggs while supported upon said carousel conveyor.

3. The invention as described in claim 2, further comprising a drain reservoir positioned beneath an egg washer body in a washer application.

4. The invention as described in claim 1, said carousel conveyor further comprising a plurality elongated and width extending support bars having an arcuate receiving surface adapted to receive the eggs at the inlet location and to unload the eggs at the outlet location.

5. The invention as described in claim 4, said support bars further comprising any of a plastic or other non-corrosive material.

6. The invention as described in claim 4, said support bars each further comprising a plurality of laterally spaced arcuate supports defining said arcuate receiving surface.

7. The invention as described in claim 6, said arcuate receiving surfaces further comprising a "C" shaped profile for supporting the eggs during conveying and candling/rotating upon said support profile between said inlet and outlet locations.

8. The invention as described in claim 6, further comprising segregating walls incorporated into each of said support bars in laterally spaced apart fashion between said support surfaces to prevent eggs from axially traversing along said support surfaces, and specifically to prevent eggs from laterally displacing at a speed sufficient to fracture adjoining supported eggs.

9. The invention as described in claim 6, further comprising opposite ends of each of said arcuate supports having inwardly turned abutments to prevent the eggs from falling off of the support surfaces.

10. The invention as described in claim 9, further comprising pluralities of fixed fingers positioned at each of said inlet and outlet locations in order to transition the eggs from the first conveyor and, subsequently, to the second conveyor.

11. The invention as described in claim 9, further comprising upper and lower pairs of pulleys for supporting said carousel conveyor.

12. The invention as described in claim 1, further comprising said plurality of egg treatment elements being integrated into panel doors of said body facing said respective ascending and descending sides of said carousel conveyor.

13. The invention as described in claim 1, further comprising a motor and drive for controlling a speed of said carousel conveyor.

14. The invention as described in claim 13, further comprising a paddle wheel transfer for controlling an egg exit speed.

15. The invention as described in claim 1, further comprising a separation screen for segregating eggs supported on the ascending side of said carousel conveyor from those on the descending side.

16. The invention as described in claim 1, said vertically extending and carousel conveyor further comprising a pair of tandem arranged carousal conveyors, a plurality of fixed ramps being located between said conveyors for transferring eggs from a first of said conveyors to a second of said conveyors.

17. A vertical egg conveying station, such as integrated into an egg handling operation, said station comprising:
    a body incorporating a vertically extending and carousel conveyor which is adapted to support pluralities of eggs during transport in successive ascending and descending fashion within said body between an inlet location and an outlet location of said body;
    said carousel conveyor further including a plurality elongated and width extending support bars having an arcuate receiving surface adapted to receive the eggs at the inlet location and to unload the eggs at the outlet location;
    said support bars each further including a plurality of laterally spaced arcuate supports defining said arcuate receiving surface;
    opposite ends of each of said arcuate supports having inwardly turned abutments to prevent the eggs from falling off of the support surfaces;
    a first egg conveyor communicating the eggs with said inlet location of said carousel conveyor and, a second egg conveyor communicating the eggs with said outlet location;
    pluralities of fixed fingers positioned at each of said inlet and outlet locations in order to transition the eggs from the first conveyor and, subsequently, to the second conveyor; and
    a plurality of egg treating elements incorporated into said body in communication with said carousel conveyor.

18. The invention as described in claim 17, said fixed fingers further extending at an angled and inter-meshing configuration and in an offset and alternately spaced fashion with said plurality of laterally spaced and arcuate supports of said elongated arcuate support bars.

19. The invention as described in claim 18, further comprising said inlet/outlet fixed transition fingers including a widened receiving platform spaced from a location of said inwardly curled end abutments of said individual arcuate egg support surfaces to prevent said support bars from contacting said fixed transition fingers.

20. The invention as described in claim 19, further comprising a continuous chain or belt for supporting said support bars.

21. A vertical egg conveying station, such as integrated into an egg handling operation, said station comprising:
  a body incorporating a vertically extending and carousel conveyor which is adapted to support pluralities of eggs during transport in successive ascending and descending fashion within said body between an inlet location and an outlet location of said body;
  said carousel conveyor further including a plurality elongated and width extending support bars having an arcuate receiving surface adapted to receive the eggs at the inlet location and to unload the eggs at the outlet location;
  said support bars each further including a plurality of laterally spaced arcuate supports defining said arcuate receiving surface;
  segregating walls incorporated into each of said support bars in laterally spaced apart fashion between said support surfaces to prevent eggs from axially traversing along said support surfaces, and specifically to prevent eggs from laterally displacing at a speed sufficient to fracture adjoining supported eggs;
  a first egg conveyor communicating the eggs with said inlet location of said carousel conveyor and, a second egg conveyor communicating the eggs with said outlet location; and
  a plurality of egg treating elements incorporated into said body in communication with said carousel conveyor.

22. A vertical egg conveying station, such as integrated into an egg handling operation, said station comprising:
  a body incorporating a vertically extending and carousel conveyor which is adapted to support pluralities of eggs during transport in successive ascending and descending fashion within said body between an inlet location and an outlet location of said body;
  a first egg conveyor communicating the eggs with said inlet location of said carousel conveyor and, a second egg conveyor communicating the eggs with said outlet location;
  a plurality of egg treating elements incorporated into said body in communication with said carousel conveyor; and
  said plurality of egg treatment elements being integrated into panel doors of said body facing said respective ascending and descending sides of said carousel conveyor.

23. A vertical egg conveying station, such as integrated into an egg handling operation, said station comprising:
  a body incorporating a vertically extending and carousel conveyor which is adapted to support pluralities of eggs during transport in successive ascending and descending fashion within said body between an inlet location and an outlet location of said body;
  a motor and drive for controlling a speed of said carousel conveyor;
  a paddle wheel transfer for controlling an egg exit speed;
  a first egg conveyor communicating the eggs with said inlet location of said carousel conveyor and, a second egg conveyor communicating the eggs with said outlet location; and
  a plurality of egg treating elements incorporated into said body in communication with said carousel conveyor.

24. A vertical egg conveying station, such as integrated into an egg handling operation, said station comprising:
  a body incorporating a vertically extending and carousel conveyor which is adapted to support pluralities of eggs during transport in successive ascending and descending fashion within said body between an inlet location and an outlet location of said body;
  a separation screen for segregating eggs supported on the ascending side of said carousel conveyor from those on the descending side;
  a first egg conveyor communicating the eggs with said inlet location of said carousel conveyor and, a second egg conveyor communicating the eggs with said outlet location; and
  a plurality of egg treating elements incorporated into said body in communication with said carousel conveyor.

25. A vertical egg conveying station, such as integrated into an egg handling operation, said station comprising:
  a body incorporating a vertically extending and carousel conveyor which is adapted to support pluralities of eggs during transport in successive ascending and descending fashion within said body between an inlet location and an outlet location of said body;
  a first egg conveyor communicating the eggs with said inlet location of said carousel conveyor and, a second egg conveyor communicating the eggs with said outlet location;
  a plurality of egg treating elements incorporated into said body in communication with said carousel conveyor; and
  said vertically extending and carousel conveyor further including a pair of tandem arranged carousal conveyors, a plurality of fixed ramps being located between said conveyors for transferring eggs from a first of said conveyors to a second of said conveyors.

* * * * *